Sept. 8, 1964 T. P. ANDERSON ETAL 3,147,561

FILM RECORD CARD

Filed Feb. 2, 1962 2 Sheets-Sheet 1

INVENTORS
THOMAS P. ANDERSON
ROBERT BEISPEL
BY
ATTORNEYS

Sept. 8, 1964 T. P. ANDERSON ETAL 3,147,561

FILM RECORD CARD

Filed Feb. 2, 1962 2 Sheets-Sheet 2

INVENTORS
THOMAS P. ANDERSON
ROBERT BEISPEL
BY
Hill, Sherman, Meroni, Gross & Simpson
ATTORNEYS

United States Patent Office 3,147,561
Patented Sept. 8, 1964

3,147,561

FILM RECORD CARD

Thomas P. Anderson, Winnetka, and Robert Beispel, Chicago, Ill., assignors to Microseal Corporation, Chicago, Ill., a corporation of Illinois Filed Feb. 2, 1962, Ser. No. 170,744
4 Claims. (Cl. 40—158)

This invention is directed to film record cards and is more particularly directed to a film record card of the type wherein microfilm strips or the like may be mounted within or on a statistical card. This case constitutes a continuation-in-part of our earlier application for patent entitled "Film Record Card," Serial No. 16,727, which was filed on March 22, 1960.

With the ever increasing use of microfilm records and statistical cards in conjunction with one another, it has become desirable to provide a means for mounting a microfilm directly on such a statistical card. Many means have in the past been devised for mounting such microfilm records on statistical cards but such prior developments have not proven entirely satisfactory.

For instance, a good many structures have been devised wherein microfilm strips are simply mounted over apertures formed within cards by means of a suitable adhesive. Other structures have been devised wherein a transparent sheet overlies the aperture within a card and is secured to one surface of the card and thereafter a microfilm strip is mounted across the aperture on the rear face of the card or directly on the transparent sheet by means of adhesives so that the front surface of the film is protected. In each of the foregoing instances however, at least one surface of the film strip is exposed and is thus susceptible to dust damage and the adverse effects of handling. Still further, in each of the foregoing types of structures, the film strip is mounted in place by means of an adhesive so that for all practical purposes the film strips are permanently mounted on their respective statistical cards.

Still other film display cards have been devised wherein film strips are adapted to be fitted within pockets formed on one surface of the statistical cards.

Still further, record cards have been devised having apertures therein which are adapted to receive separate film holder assemblies which themselves serve as a mounting means for a film strip and which are adapted to be inserted within the record card aperture and secured therein by a suitable means. In these structures, however, the film holder assembly must be removed before a film strip may be inserted or removed from the film holder assembly itself.

We have devised a film record card which is believed to obviate each of the above enumerated disadvantageous characteristics of prior types of film record cards but which is very simple in design and which is therefore economical to produce and use while facilitating utilization of the film strip.

In general, one aspect of the invention contemplates the provision of a record card having an aperture formed therein and having transparent enveloping members or sheets disposed on opposite sides of the card and overlying the aperture. The sheets, if rectangular in configuration, have three edges thereof secured to the opposed surfaces of the card by means of a suitable adhesive or the like which is placed on the card along the edges of the aperture but the fourth edges thereof are not sealed to the card although they do overlie the card (that is, that edge of each sheet does not terminate at the edge of the aperture). A microfilm strip may thus be inserted into the pocket formed intermediate the enveloping members, between one surface of the card and that portion of the transparent sheet mounted thereon which is not secured to the card surface. Inasmuch as the unsecured edge of the transparent sheet overlies the adjacent surface of the record card, very little dust will seep into the pocket formed intermediate the enveloping members and the film strip will thus practically be protected from all atmospheric impurities and will, of course, be protected from stains, etc. resulting from handling of the card. Nonetheless, since no adhesive is used on the film strip for maintaining it in its proper position within the record card aperture, the film strip may readily be removed from the card pocket.

It is important to understand that in this embodiment of the invention no portion of the enveloping member is cut out to expose any surface of the microfilm mounted within the aperture since in such a case the microfilm would not be provided with the desired protection.

Assuming that the film strip is translucent, the film strip may be viewed while still mounted on the record card since light may be transmitted through the transparent enveloping members. In view of this fact, a projector might be adapted to accept such a record card so that the image on the film strip could be projected on a screen to enlarge the image without necessitating removal of the film strip from its mounted position on the record card. Here too, it is important that the enveloping members not have cut-out portions which expose a part of the microfilm strips since the edge of one or more of the enveloping members extending across a face of the film strip would hamper satisfactory projection and viewing of the image on the film strip.

It should be also understood that one of the transparent sheets may have its entire peripheral edge sealed to the surface of the card while the other sheet has only three edges thereof secured to the card. In some instances it may be desirable however to provide both enveloping members with an unsecured edge particularly where it is preferable to have a means for mounting a film strip on the card from either surface of the card for use in tabulating machines.

In any case however, the arrangement wherein the enveloping members completely overlie the edges of the aperture assures, in addition, that the moisture of film strips mounted within the card pockets will be effectively retained, thus prolonging the life of the film strips and preventing them from becoming brittle at an early date.

Film record cards are generally used in very large quantities running often into the many thousands. While the principal object of our invention lies in the provision of means for mounting a film strip within the card, it must be borne in mind that the card generally has indicia of one sort or another formed in or over all or a portion of one or both sides of the card. The indicia may comprise a series of punched holes or a series of magnetic ink impressions or the like as will be familiar to those skilled in the art. To faciliate sorting of these cards, automatic sorting machines have been devised which have means for sensing the data on or in the cards and sorting the cards accordingly. Such sorting machines are almost universally adapted to pass record cards therethrough in a sideways manner as opposed to an endwise manner. Sensing fingers are generally employed in these sorting machines and there is relative movement between these fingers and the cards from one side of each card to the other as it passes through the machine.

The presence and action of the sensing fingers in record card sorting machines present problems in the construction and design of film record cards. Film record cards heretofore devised have caused considerable jamming in record card sorting machines with the result that the sorting machines have had to be operated at very slow speeds. Furthermore, many prior types of film record cards have not been effective in protecting the film piece contained with the card.

We have obviated each of these problems. The film piece protection problem has been obviated in a manner already mentioned above. The problem of sorting machine jamming has been obviated effectively by mounting very thin enveloping members over the record card aperture and sealing the edges of the enveloping members to the card so that there is no free loose edge which might be caught by a sensing finger in a sorting machine. The unsecured edge of one or both of the enveloping members is straight and lies in a plane parallel to the path of movement of the record card through the machine. Since record cards are generally moved through the sorting machines in a sideways fashion, the unsecured edge or edges of one or both of the enveloping members is parallel to the ends of the card. By arranging the enveloping members in this fashion no portion thereof is presented which might be caught by one or more of the sensing fingers.

Generally speaking, it will be most desirable to provide an aperture in the record card which is only slightly larger than the film strip to be mounted therein so that the edges of the card defining the aperture will maintain the film strip in a fixed position. Under some circumstances, however, film strips of constant width but of varying lengths may be mounted within the record cards. In order to assure that both short and long film strips which are of equal width will be maintained in a fixed position within the record card aperture regardless of their respective lengths, we have conceived the idea of providing a means on the card for gripping the side edges of the film strip when it is inserted into the film pocket so that it will not be permitted to move longitudinally within the film pocket. In one embodiment of the invention we have provided the side edges of the record cord aperture with inwardly extending arcuately shaped portions which will snugly engage the side edges of the film strip. In another embodiment of the invention we have provided controlled diameter glue dots at the side edges of the record card aperture which are applied when the adhesive is applied to the card for mounting the enveloping members thereon and which serve the same purpose as the arcuate side edges above referred to.

It will be understood of course that the unsecured edges of the enveloping members lie in juxtaposition to the respective faces of the record card. It has been found that if the unsecured surface of an enveloping member is arcuately shaped or non-linear instead of being straight edged, the enveloping members may be ripped or torn when one attempts to force a film strip into the film pocket. We have found that by providing the unsecured edge of an enveloping member with a straight edge such tearing can be effectively prevented since the straight edge of the film strip being inserted into the film pocket will evenly engage the unsecured straight edge of the enveloping member throughout the whole length of the film strip end so that the edge of the enveloping member will buckle under to permit the film strip to be inserted into the film pocket.

It should also be understood that film record cards of the type above described are generally employed in great quantities and are stacked or racked so that it is desirable to keep the extra thickness of the card created by the addition of the film pocket to a minimum. To this end it is of course desirable to prevent the mounted film strip from creeping up over the edge of the record card to the space between the record card and an enveloping member. In order to prevent such movement of the film strip, the adhesive coating which serves to mount the enveloping members on the card is most advantageously applied right up to the edge of the card defining the aperture.

As above noted, record cards constructed in accordance with this invention have the unsecured edges of the enveloping members extending beyond the end of the aperture and the adhesive coating must accordingly extend beyond the aperture edge for the same distance in order to prevent the unsecured end of the enveloping member from flapping so as to prevent it from being torn or ripped off the card. This extended adhesive coating however has been found to present its own difficulties inasmuch as the ends of the unsecured edge of an enveloping member are not free to buckle under when a film strip is inserted into the film pocket with the result that film strip insertion is made quite difficult and/or the enveloping member becomes ripped by the leading edge of the film strip. In order to obviate these difficulties, we have applied the adhesive coating to the card so that the inner periphery thereof tapers outwardly from the corners of the aperture adjacent the unsecured edge of the enveloping member. By so tapering the adhesive coating, the unsecured edge of the enveloping member is maintained in its proper position in juxtaposition to the face of the record card but the portion of the unsecured edge of the enveloping member engaged by the leading edge of the film strip when that film strip is inserted in the film pocket is free to buckle under to permit such insertion.

As alluded to above, it is quite desirable to maintain the additional thickness required by the added enveloping members to a minimum. This consideration of thickness presents a considerably greater problem in instances in which the record cards are to be used in automatic sorting or processing equipment. Such automatic sorting equipment is generally provided with friction rollers or the like which engage each end of a record card and pull that card through the sorting machine. If the thickness of the card at one end thereof is greater than that at another end thereof the friction rollers may tend to grab one end of the card and pivot the card about that end and thereby cause possible malfunction of the sorting machine with a resultant stoppage of work flow through the machine.

Experiments have shown that record cards having film pockets formed on one end thereof which give that end of the card a thickness of 2.4 mils (0.0024 inch) or more greater than the opposite end of the card have not been satisfactory and could not be satisfactorily processed through known types of automatic sorting machines. We have employed transparent materials for the enveloping members which have a thickness of ½ mil or less so that the combined thickness of the two enveloping members is 1 mil or less. The adhesive coating has a negligible thickness and need not here be considered. It has been found that cards constructed in this manner may be used in sorting machines which sort 2,000 cards per minute without any resultant machine jamming. Such rapid sorting of film record cards of the type above described has not been heretofore possible.

As a matter of comparison, it may be noted that tabulator cards generally have a thickness of about 7.4 mils while microfilm may have a thickness of from 6.5 to 7 mils. The total additional thickness of 1 mil or less is quite small when considered in light of the purpose film pocket serves and provides a card which can be sorted through the rapid sorting equipment now employed in industry.

Another embodiment of the invention is directed to a record card which is not principally designed to be used in automatic sorting equipment but which is adapted to be used in situations in which it is not necessary to protect both surfaces of the film strip from dust or stains. In this embodiment of the invention an adhesive coating is applied to one surface of a card in the same manner as has heretofore been discussed with the exception that a small space is left between the inner periphery of the adhesive coating and the edges of the card aperture so that a small ledge is formed upon which a film strip may seat. The film strip is thus maintained in position on the ledge between the card surface and the enveloping member.

In such a record card however it has been found that insertion of the film strip may be hindered due to a slight buckling of the film strip as it is inserted into its proper position since the leading edge of the film strip may buckle rearwardly of the enveloping member and strike the rear edge of the aperture. To obviate such a disadvantageous feature, we have tapered the rear edge of the aperture outwardly so that the aperture edge, when striking the leading edge of the film strip, will act to level out the buckle in the film strip and thus seat the leading edge thereof properly on the ledge adjacent the rear edge of the aperture.

It is therefore an object of our invention to provide a film record card having a means for mounting a film strip on a card in such a manner that the strip will be protected on each side thereof from atmospheric impurities and from stains, etc. resulting from handling of the card.

Another object of the invention resides in the provision of a record card having an aperture formed therein and having transparent enveloping members mounted on opposite surfaces of the card and overlying the aperture and sandwiching a translucent film strip therebetween.

A still further and important object of the invention is directed to the provision of means for snugly engaging the side edges of a film strip when the film strip is mounted within a record card aperture to prevent movement of the film strip therein.

Yet another object of the invention is directed to the provision of a card of the type above described having the enveloping members secured to the surfaces of the card by an adhesive coating in a manner which will facilitate insertion of a film strip.

These and other objects of the invention will appear from time to time as the following specification proceeds and with reference to the accompanying drawings, wherein.

Figure 1:
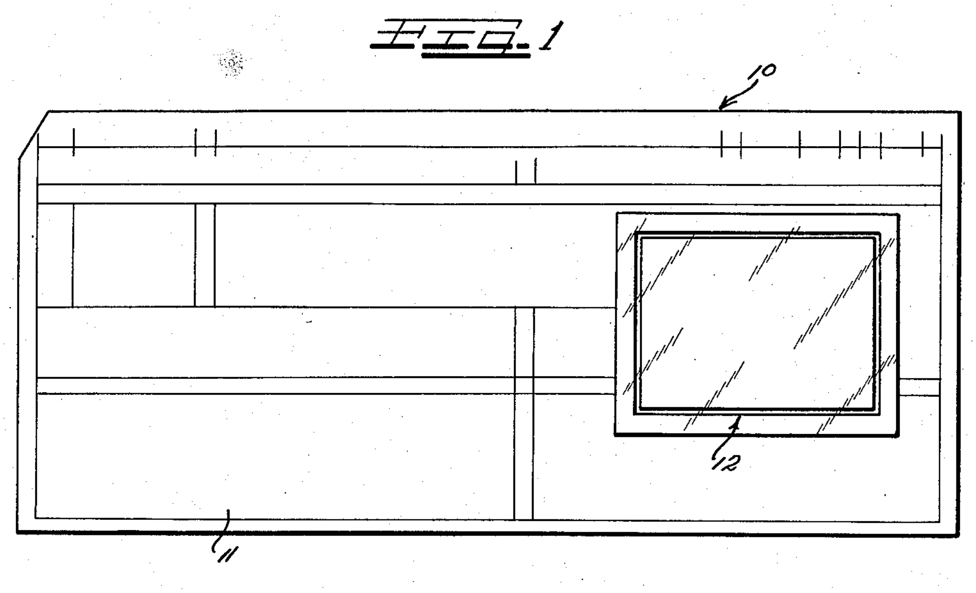
FIGURE 1 is a front elevational view of a film record card constructed in accordance with the principles of the present invention.

Referring initially to FIGURE 1, a film record card 10 is illustrated as comprising the usual statistical card 11 having a rectangular aperture 12 formed therein.

Transparent enveloping members or sheets 13 and 14 are rectangular in configuration and are mounted on the front and rear surfaces, respectively, of the card 11 so that they overlie the aperture 12. The rear sheet 14 may be secured to the rear wall of the card 11 around the aperture 12 about the entire periphery thereof by means of a suitable adhesive coating. However, in FIGURE 2 the enveloping members 13 and 14 are illustrated as being mounted over the aperture so that their edges overlie portions of the card defining the aperture but only three edges of each of the enveloping members are secured to the respective surfaces of the card. In each case an unsecured portion of the enveloping member (13*a* and 14*a*, respectively) overlies the card. Since the unsecured edge portions 13*a* and 14*a* are affixed to the record card only at their ends, a slight gap 15 may be formed between the enveloping members and the record card. In fact, this gap would be very small and may not exist at all. This of course would be dependent upon the manner in which the enveloping members were mounted on the record and on whether or not the record card is disposed in a completely flat plane. It is very important to understand that the unsecured edge or edges of one or both of the enveloping members lies parallel to the ends of the card so that when the record card is passed sideways through a film sorting machine, the sensing fingers, rollers, and the like will not catch on any part of the enveloping member.

Figure 2:
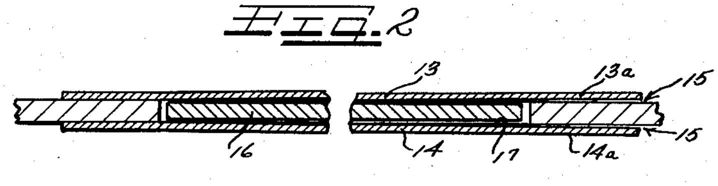
FIGURE 2 is a fragmental vertical sectional view of the card illustrated in FIGURE 1.

Generally speaking, it will be understood that a film strip 16 may be inserted through the gap 15 into the film pocket 17 formed intermediate the enveloping members 13 and 14 and that once disposed within the pocket, as illustrated in FIGURE 2, it will be protected from substantially all atmospheric impurities as well as from stains caused by handling and the like. Since the enveloping members 13 and 14 are transparent, light may be transmitted through the enveloping members as well as the film 16 if it is desired to project the film image on a screen and thus removal of the film for this purpose is not necessitated. Still further, practically all foreign particles will be prevented from entering the pocket 17 since the edge portions of the enveloping members which are not secured to the card 11 substantially overlie the card and are normally maintained in juxtaposition with the respective surfaces of the card due to the fact that they are maintained relatively taut by the other secured edges thereof.

The film strip 16 is thus secured within the card 11 in such a manner that it may be readily viewed at will without necessitating its removal from the card while at the same time, it is protected from damage but is not itself physically altered since no adhesives are applied to the film strip. Furthermore, the film 16 is protected from being accidentally damaged since it is held in coplanar relation with the card 11 by the enveloping members 13 and 14. Viewing of the film strip by light projection through the film pocket is not hampered by an edge of one or more of the enveloping members overlying the surface of the film strip as is true in some prior devices of this type.

Figure 3:
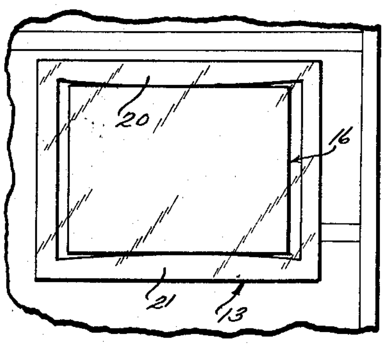
FIGURE 3 is a fragmental plan view of another embodiment of our invention.
Figure 4:
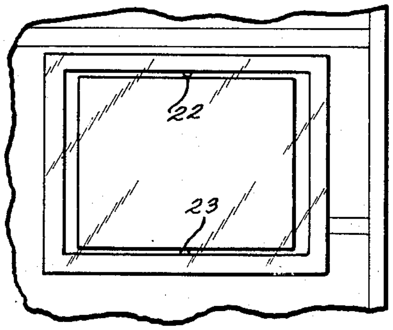
FIGURE 4 is yet another fragmentary plan view of a different embodiment of our invention employing controlled diameter glue dots for snugly engaging the side edges of a film strip.

A particularly important feature of the invention is illustrated in FIGURES 3 and 4. It will be understood that microfilm strips are generally of constant width though they may vary to some degree in length. Projection devices have been designed for accepting record cards constructed in the manner disclosed herein so that the image contained on a film strip which is mounted within the film pocket may be enlarged and projected on a screen.

For such applications it is desirable that the film strip be mounted at the "optical center" of the film pocket. It will also be observed that it is desirable to prevent the film strip from moving within the film pocket at all times since such movement of the film strip might accidentally cause the film strip to slip out of the film pocket.

To obviate the above noted conditions, we have designed a film record card with inwardly extending arcuate card edges such as 20 and 21 in FIGURE 3 which are spaced apart a distance approximating the width of a film strip. We have found that it is not desirable to maintain this minimum aperture width throughout the entire length of the aperture since such a construction would make film strip insertion extremely difficult. The arrangement shown in FIGURE 3 serves to provide the desired end of preventing movement of the film strip within the film pocket, since the inwardly extending arcuate edges 20 and 21 snugly engage the side edges of the film strip, but the step of film strip insertion is in no way hindered.

In the embodiment of the invention illustrated in FIGURE 4, controlled diameter glue dots 22 and 23 are formed along the side edges of the aperture and are spaced apart a distance approximating the width of the normal film strip. These glue dots may be formed in a number of places along the side edges of the aperture (though preferably not adjacent the end of the aperture through which film strips are inserted) and may be placed in the desired location in a controlled manner at the same time that adhesive is applied to the face of the card prior to fitting of the enveloping member over the aperture.

A still further and quite practical means of maintaining the film strip within the film pocket comprises the heat sealing of the two enveloping members at points adjacent to and spaced around the edges of the film strip. Such heat sealing might be effected with the use of benzyl alcohol. The enveloping members would be heat sealed at one or more different points after the insertion of the record card into the film pocket and, if desired, the members could be heat sealed around only three edges of the film strip to permit subsequent removal thereof from the film pocket.

It is important to emphasize the fact that film record cards of the types illustrated in FIGURES 1 through 4 can be rapidly processed through known types of sorting and tabulating machines at rates which have not been heretofore possible. Such processing machines generally employ both rollers and feelers (which are often arranged to contact both sides of the record cards). Since the enveloping members formed on the cards illustrated in FIGURES 1 through 4 completely overlie both sides of the film strip, no part of the film strip ever comes into contact with these members with the result that contamination of the film strip is thereby prevented. Since the enveloping members entirely overlie the aperture, the edges of the aperture are not exposed to the rollers or feelers. Thus, the thin enveloping member edges will be the only edges exposed to the feelers. Also, the unsecured edges of the enveloping members lie along lines parallel to the direction of movement of the record cards through known types of tabulating machines and this fact further reduces the propensity for the cards to be damaged or cause malfunction of the machine.

In connection with the foregoing it should be pointed out that the record cards illustrated in FIGURES 1 through 4 have a distinct advantage over any prior types of record card structures in that the edges of the card defining the aperture act as abutments for preventing transverse or lengthwise movement of the film strip mounted within the film pocket. In many prior types of devices, as where a film strip is mounted on the face of a card by an enveloping member glued to the same surface of the card, the enveloping member must itself act as an abutment for the edges of the film strip. Film strip edges are of course quite sharp and under such circumstances may tend to tear or gradually wear the enveloping member if the film strip is not otherwise prevented from moving when it is disposed within the film pocket.

As heretofore noted, in order to prevent any possibility that the film strip within the film pocket might creep up onto the surface of the record card between the record card and the enveloping member, it is desirable to apply the adhesive coating up to or very close to the edges of the aperture.

Figure 5:
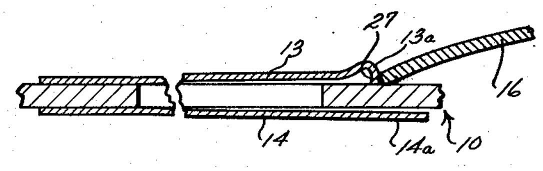
FIGURE 5 is a fragmentary vertical sectional view of the record card illustrated in FIGURE 1 illustrating the manner in which the leading edge of the film strip acts to buckle under the unsecured edge of an enveloping member.
Figure 6:
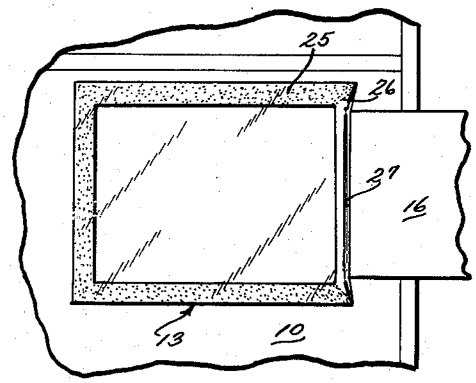
FIGURE 6 is a fragmentary plan view illustrating the insertion of a film strip.

It has also been observed that additional problems are posed by the application of an adhesive coating to the card in a manner such that the innermost edge of the coating extends in a straight line from each of the side edges of the aperture a sufficient distance past the end edge of the aperture to secure the end portions of the unsecured ends 13*a* and 14*a* to the card. In order to facilitate film strip insertion, we have applied the adhesive coating 25 so that the inner periphery 26 thereof tapers outwardly from the corners of the aperture adjacent the unsecured end portions of the enveloping members. By applying the adhesive coating 25 in this manner, the unsecured edge portion 13*a* of the enveloping member 13 can be buckled or "humped" in the manner illustrated in FIGURE 5 along the entire leading edge 27 of the film strip 16. If the adhesive coating 25 were not tapered as at 26, such buckling or "humping" might not be effected at the outer ends of the leading edge of the film strip 16 with the result that the enveloping member 13 might be torn when one attempted to force the film strip into the film pocket.

Turning once again to FIGURE 5 of the drawings, it will be observed that the film strip 16 is somewhat curled. The curl in the film results from the storage of microfilm on spools and can be employed to advantage in inserting the film within the film pocket. We have discovered that by placing the leading edge of a film strip on the surface of the record card so that the natural curl of the film bends toward that surface of the card, the natural curl in the film will prevent the leading edge thereof from riding up over the unsecured edge of the enveloping member, thereby greatly facilitating the film strip insertion operation.

In the past, those skilled in the art have employed means to flatten the film prior to insertion in film holders of one sort or another and our invention resides, in part, in the concept of utilizing the natural curl of the film to facilitate the film strip insertion operation.

Figure 10:
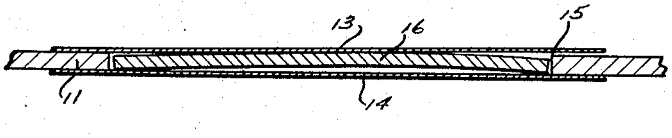
FIGURE 10 is a vertical sectional view of yet another embodiment of our invention.
Figure 7:
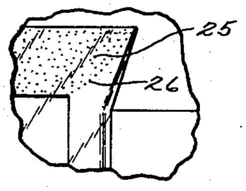
FIGURE 7 is an enlarged fragmentary plan view of the card illustrated in FIGURE 6 which more clearly shows the tapered inner periphery of the adhesive coating.

For instance, in the embodiment of our invention shown in FIGURE 10, a film pocket 17 is formed by glueing all four edges of the lower enveloping member 14 to the undersurface of the card 11 and by mounting the upper enveloping member 13 to the upper surface of the card in the manner heretofore described so as to leave a slight gap 15 along one edge thereof to permit insertion of the film. The film is inserted into the pocket 17 so that, once it is within the pocket, its end edges will be curled toward the enveloping member 14. When a curled film strip is inserted into the pocket 17 in this manner the end edges of the film will contact the enveloping member 14 and the center of the film strip will contact the enveloping member 13 and the film will be wedged within the pocket between the enveloping members so that, practically speaking, it cannot accidentally fall out of the pocket 17.

Figure 9:
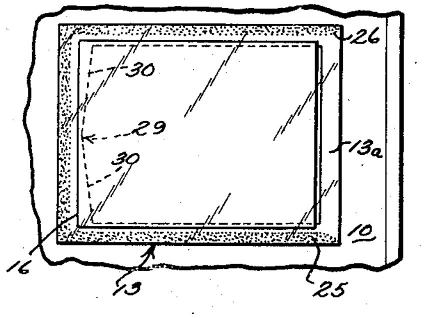
FIGURE 9 is a plan view of the embodiment of the invention illustrated in FIGURE 8.
Figure 8:
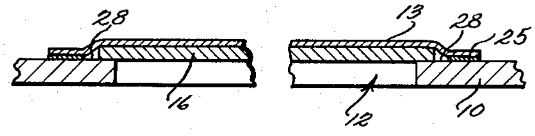
FIGURE 8 is a vertical sectional view of yet another embodiment of our invention wherein a film strip is maintained between an enveloping member and one surface of the record card.

FIGURES 8 and 9 are particularly directed to low cost film record cards which are not designed to be employed in automatic tabulating or sorting machines and which are adapted to be used under circumstances in which protection of both surfaces of the film strips from stains and dust is not an important factor.

In this embodiment of our invention, the adhesive coating 25 is applied to the surface of the record so that its inner periphery is spaced from the edges of the aperture a sufficient distance to provide ledges 28 therearound. As viewed in FIGURE 8 it is arranged so that a film strip 16 can be mounted over the aperture 12 on the ledges 28 but beneath the protective enveloping member 13.

The unsecured edge 13a of the enveloping member 13 is otherwise mounted on the record card by the adhesive coating 25 in the same manner as has been discussed above and the adhesive coating is tapered outwardly as at 26 at the "insertion end" of the aperture.

As already noted we have found that insertion of film strips between the record card face and the enveloping member 13 is greatly facilitated by cutting the aperture 12 so that the rear end edge 29 thereof comprises a pair of segments 30 which meet at a vertex that is displaced outwardly from the rear corners of the aperture. As a result, when the film strip is inserted between the enveloping member 13 and the face of the record card 10, the leading edge 27 of the film strip will first abut the rear end edge 29 near the corners of the leading edge and further movement of the film strip in the same direction will tend to raise any buckle in the film strip so that the film strip may be moved all the way to the position illustrated in FIGURE 9 with the entire leading edge 27 lying on the ledge formed at the rear of the film pocket. An otherwise difficult and slow film strip mounting process may thereby be greatly facilitated with the result that film strip insertion into such a film record card may be rapidly effected.

We have found that polyethylene terephthalate films such as "Mylar" (produced by du Pont de Nemours & Co. of Wilmington, Delaware, U.S.A.) are ideally suited for use in forming the enveloping members. Such films may have a thickness as small as 0.00025 inch and can be satisfactorily employed with thicknesses up to 0.0005 inch.

Mylar is a rugged, clear film having about ⅓ the strength of machine steel and having a tensile strength of 17,000 to 20,000 p.s.i. which is about twice that of cellophane and five times that of polyethylene. One of its properties consists of the fact that it has excellent resistance to acids, greases, oils, and organic solvents. Still further, such a film can be produced in a transparent but colored form so that it can act as a filter in the manner above described.

Magnetic ink can readily be applied to a polyethylene terephthalate film and will adhere thereto. Mylar film also has a high insulation resistance and well balanced electrical properties so that by placing magnetic ink on enveloping members formed of such material, the members themselves can serve as a repository for additional media. This is an important factor in the formation of record cards since there is now an ever-increasing desire to place more and more media on a tabulator card.

Tabulator cards generally have media stored thereon which is determined by the disposition of a plurality of punchings or holes in the record card or by the application of a magnetic ink to one or more surfaces of the card which are coated to receive such an ink. Operators however have been prone to space the magnetic ink applications or punchings a substantial distance from the record card aperture of the enveloping member or members in order not to interfere with or damage the film pocket or the film strip contained therein.

By employing a Mylar film which can readily receive a magnetic ink, the media storage space on one or both faces of the record card can be substantially increased. While it would be possible to apply a transparent magnetic ink across the entire face of one or both of the enveloping members, it will generally be found desirable to apply the magnetic ink only to that portion of each enveloping member which overlaps that portion of the card defining the aperture therein. Otherwise, the magnetic ink applied to that portion of the enveloping member overlying the aperture and the film strip contained therein would preclude distortion free projection of the film strip image on a screen. Of coure, if distortion free projection of the film strip image while it is in the film pocket is not a critical factor, then magnetic ink could be applied across the entire surface of the enveloping member.

It will be understood that a film record constructed in accordance with the principles of this inveniton will have a wide variety of uses but it should be kept in mind that one of the primary features of the invention relates to record cards which, although capable of varied applications, are well suited to be processed through automatic tabulating machines at a rate which has heretofore not been possible with film record cards.

It will be understood that this embodiment of the invention has been used for illustrative purposes only and various modifications may of course be made from our invention without departing from the spirit and scope of the novel concepts thereof.

We claim as our invention:

1. A film record card having:
a generally rectangular cut-out formed therein,
enveloping members attached to said card and overlying said cut-out for forming in conjunction with said cut-out a pocket for receiving a film strip,
means for permitting insertion and removal of the film strip into and out of the pocket, and
a glue dot formed along an edge of said cut-out and engaging the said film strip in sopt contact for releasably maintaining said film strip in a fixed position within said cut-out.

2. A film record card having:
a generally rectangular aperture formed therein having spaced side edges and end edges defining the perimeter of said aperture,
enveloping members overlying said aperture secured to said card on opposite sides thereof to form a pocket for housing and mounting a film strip,
means along at least one of said side edges releasably gripping one portion of a corresponding edge of the film strip housed within the pocket to restrict movement thereof,
and means for permitting insertion and removal of the film strip into and out of the pocket.

3. A film record card having:
a generally rectangular aperture formed therein having spaced and substantially parallel side edges and end edges respectively defining the perimeter of said aperture,
first and second transparent enveloping members situated respectively on opposite sides of said card and overlying said card about the perimeter of said aperture to form a pocket in conjunction with said aperture for housing a film strip,
means for permitting insertion and removal of the film strip into and out of the pocket,
bonding means for securing the overlying portion of said enveloping members to said card along at least three edges of said aperture, and
a discrete mass of adhesive between said enveloping members along at least one of said side edges substantially centrally thereof releasably engaging in spot contact a corresponding edge of a film strip housed within said pocket for rendernig said corresponding edge relatively immovable with respect to said one side edge, whereby to permit insertion and removal of the film strip into and out of the pocket.

4. A film record card having:
a generally rectangular aperture formed therein having spaced and substantially parallel side edges and end edges defining the perimeter of said aperture,
first and second transparent enveloping members situated respectively on opposite sides of said card and overlying said card about the perimeter of said aperture to form a pocket in conjunction with said aperture for housing a film strip being dimensioned less than said aperture to have corresponding side and end edges situated in spaced relation to the side and end edges of said aperture, bonding means for securing all but one of the overlying portions of both of said enveloping members to said card whereby an ingress area is provided for inserting a film strip into said pocket, and movement restricting means situated between said enveloping members and extending into said aperture from at least one of said side edges substantially centrally thereof and releasably engaging a single portion of a corresponding edge of a film strip housed within said pocket for rendering said single portion relatively immovable with respect to said one side edge, whereby to permit insertion and removal of the film strip into and out of the pocket.

References Cited in the file of this patent

UNITED STATES PATENTS

| | | |
|---|---|---|
| 1,397,096 | Hammer | Nov. 15, 1921 |
| 2,161,396 | Wittel | June 6, 1939 |
| 2,532,776 | Linser | Dec. 5, 1950 |
| 2,633,654 | Roetger | Apr. 7, 1953 |
| 2,843,955 | Engelstein | July 22, 1958 |
| 3,019,579 | Heckman | Feb. 6, 1962 |

FOREIGN PATENTS

| | | |
|---|---|---|
| 51,461 | Switzerland | May 25, 1910 |